United States Patent [19]

Geopfarth

[11] 4,383,300
[45] May 10, 1983

[54] MULTIPLE SCANIVALVE CONTROL DEVICE

[75] Inventor: Robert N. Geopfarth, Albuquerque, N. Mex.

[73] Assignee: The United States of America as represented by the Secretary of the Navy, Washington, D.C.

[21] Appl. No.: 137,172

[22] Filed: Apr. 4, 1980

[51] Int. Cl.$^3$ .......................... G06F 15/20; G01P 5/14
[52] U.S. Cl. ..................................... 364/558; 364/900
[58] Field of Search ............... 364/100, 107, 111, 558, 364/200 MS File, 900 MS File; 73/708, 753, 714, 754

[56] References Cited

U.S. PATENT DOCUMENTS

| | | | |
|---|---|---|---|
| 3,541,513 | 11/1970 | Paterson | 364/200 |
| 3,833,930 | 9/1974 | Macker | 364/200 |
| 3,878,376 | 4/1975 | Sholes, Jr. et al. | 364/558 |
| 4,228,496 | 10/1980 | Katzman et al. | 364/200 |
| 4,263,655 | 4/1981 | Chappell, Jr. | 364/558 |

OTHER PUBLICATIONS

Anderson, Robert C., "A Microprocessor Controlled Pressure Scanning System", Conference: Proceedings of the 22nd International Instrumentation Symposium, San Diego, CA, (May 25–27, 1976).

*Primary Examiner*—Edward J. Wise
*Attorney, Agent, or Firm*—R. S. Sciascia; Charles D. B. Curry; Francis I. Gray

[57] ABSTRACT

A controller featuring digital address display, manual control functions, signal conditioning, transducer outputs and computer address interrogation for a plurality of multi-port devices. For address interrogation the controller is compatible with a standard digital interface bus. The current device address is input to a plurality of multiplexers. The address of the device to be selected is transmitted from a computer through the interface bus to a data input/output circuit which routes the address data to a data storage unit. The address data is used to address the multiplexers to transmit to the interface bus the state of the device selected by the address data.

1 Claim, 11 Drawing Figures

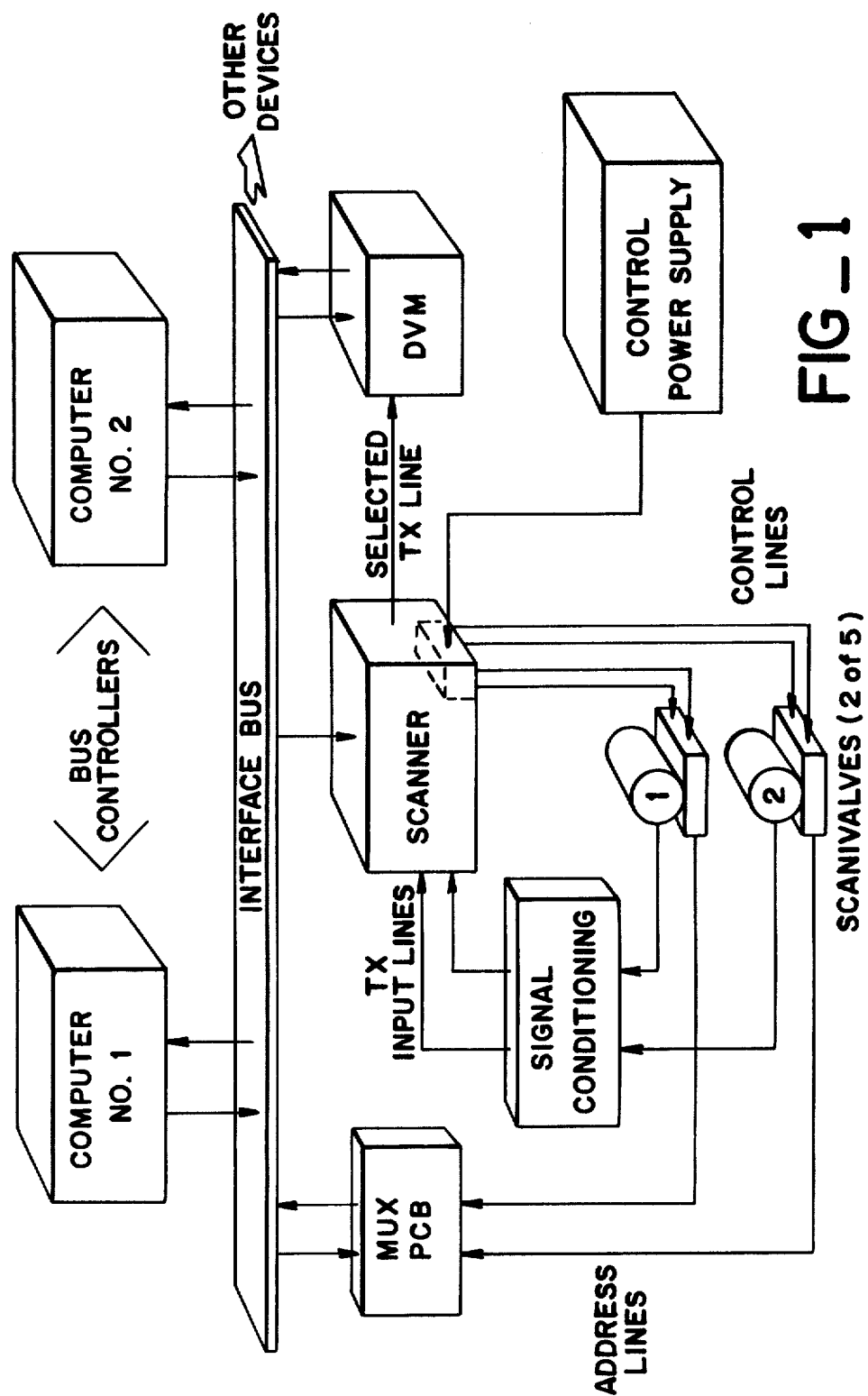

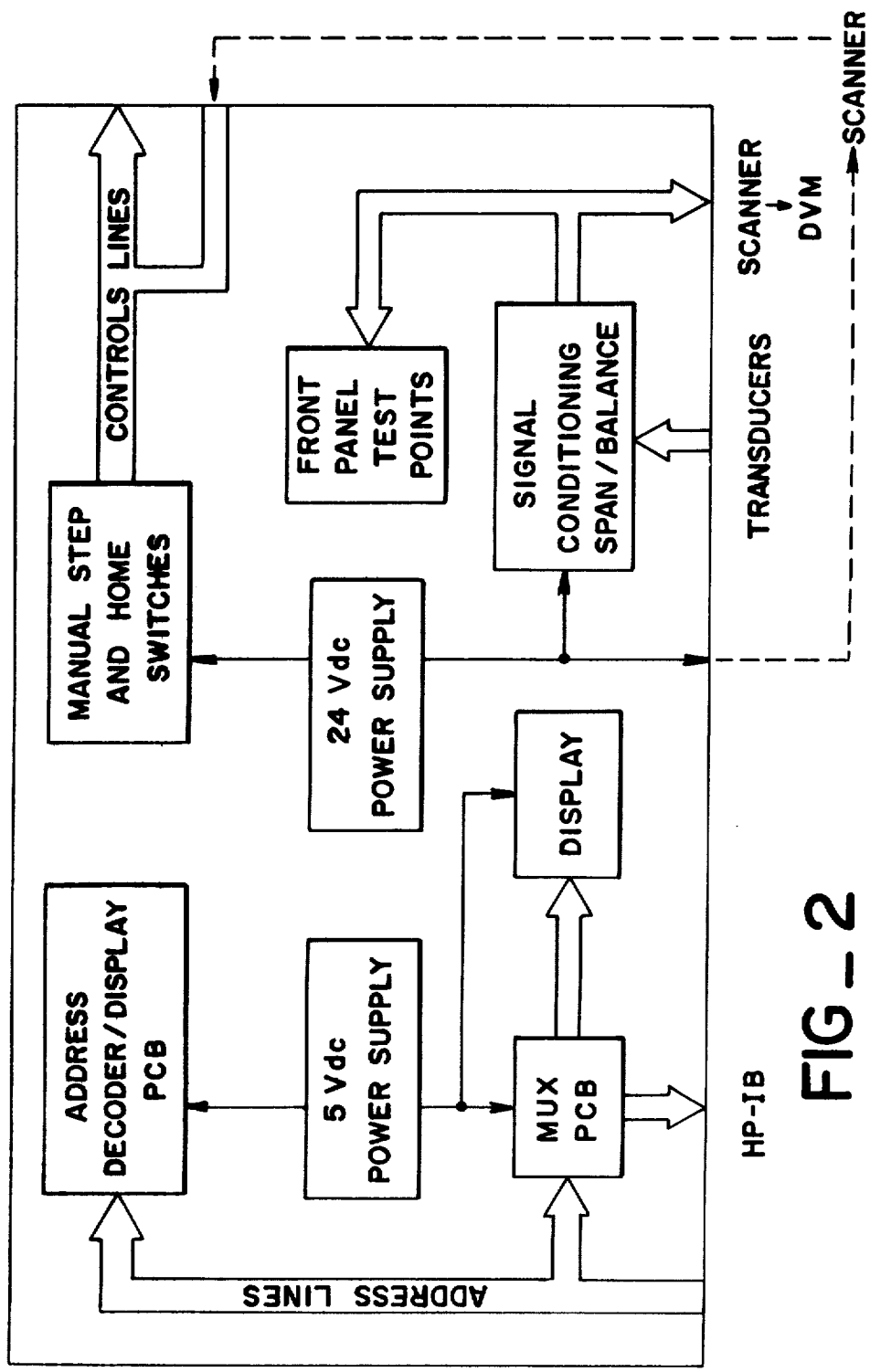

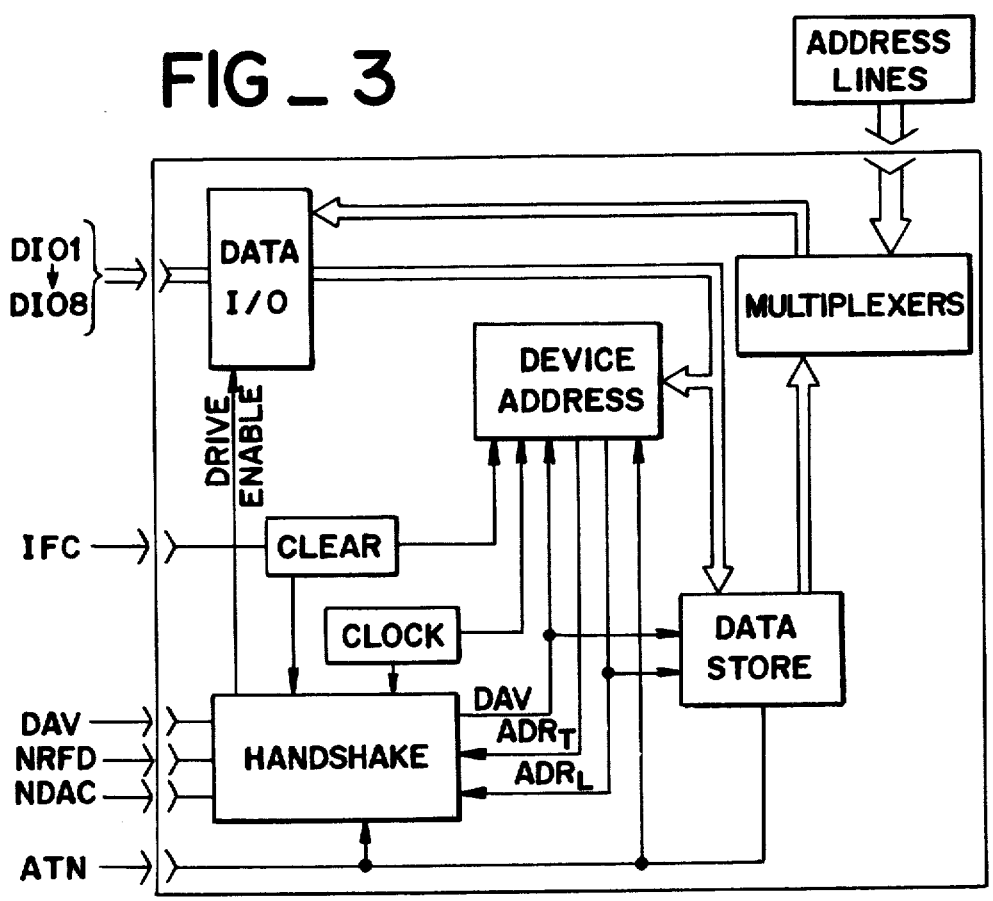
FIG_3
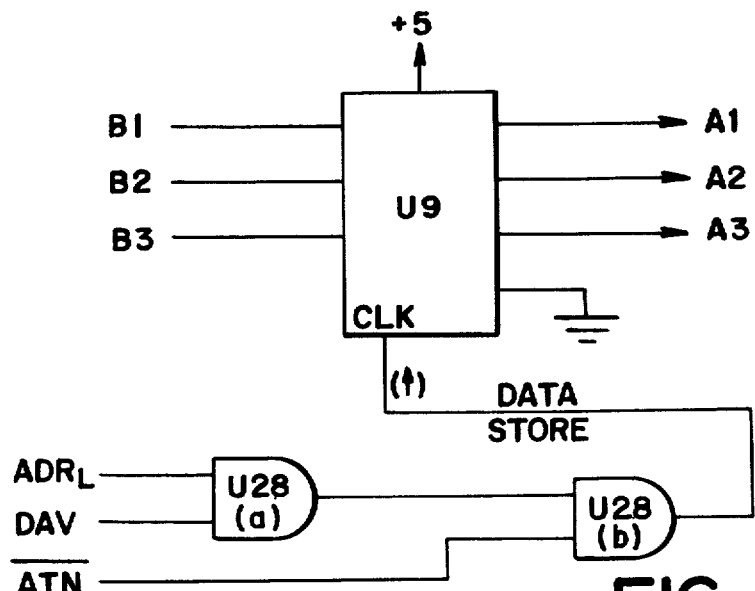
FIG_6

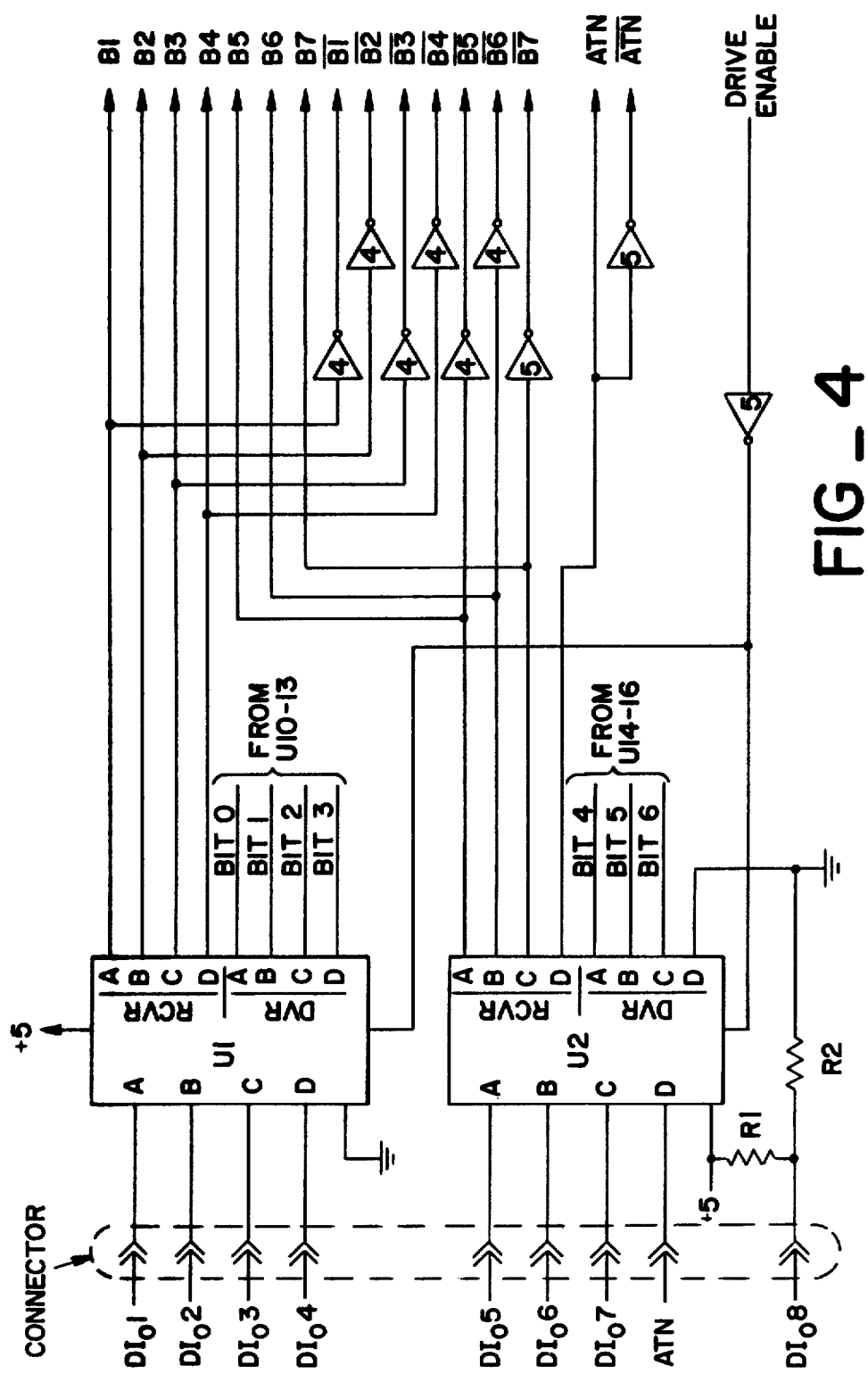
FIG_4

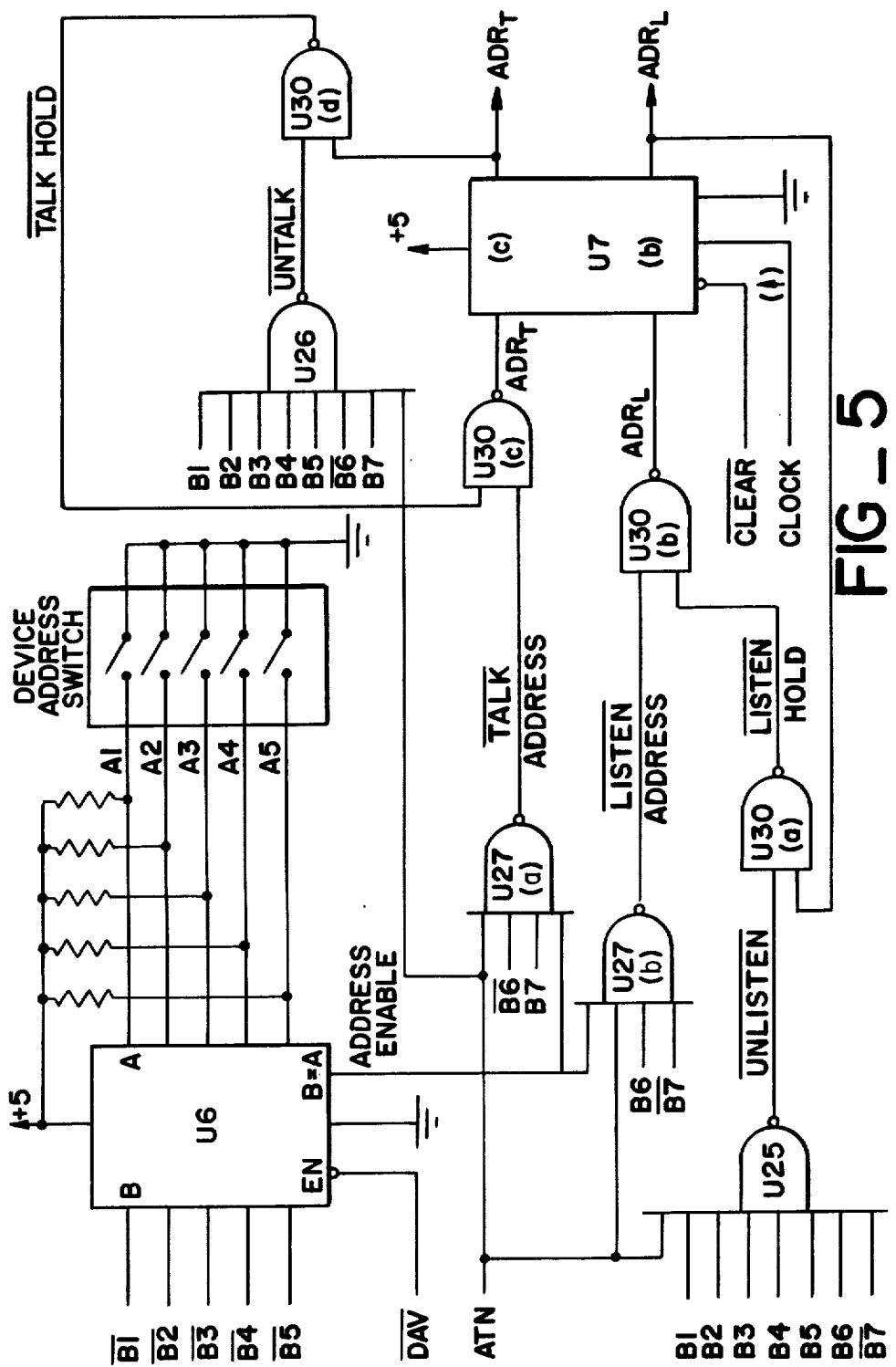
FIG_5

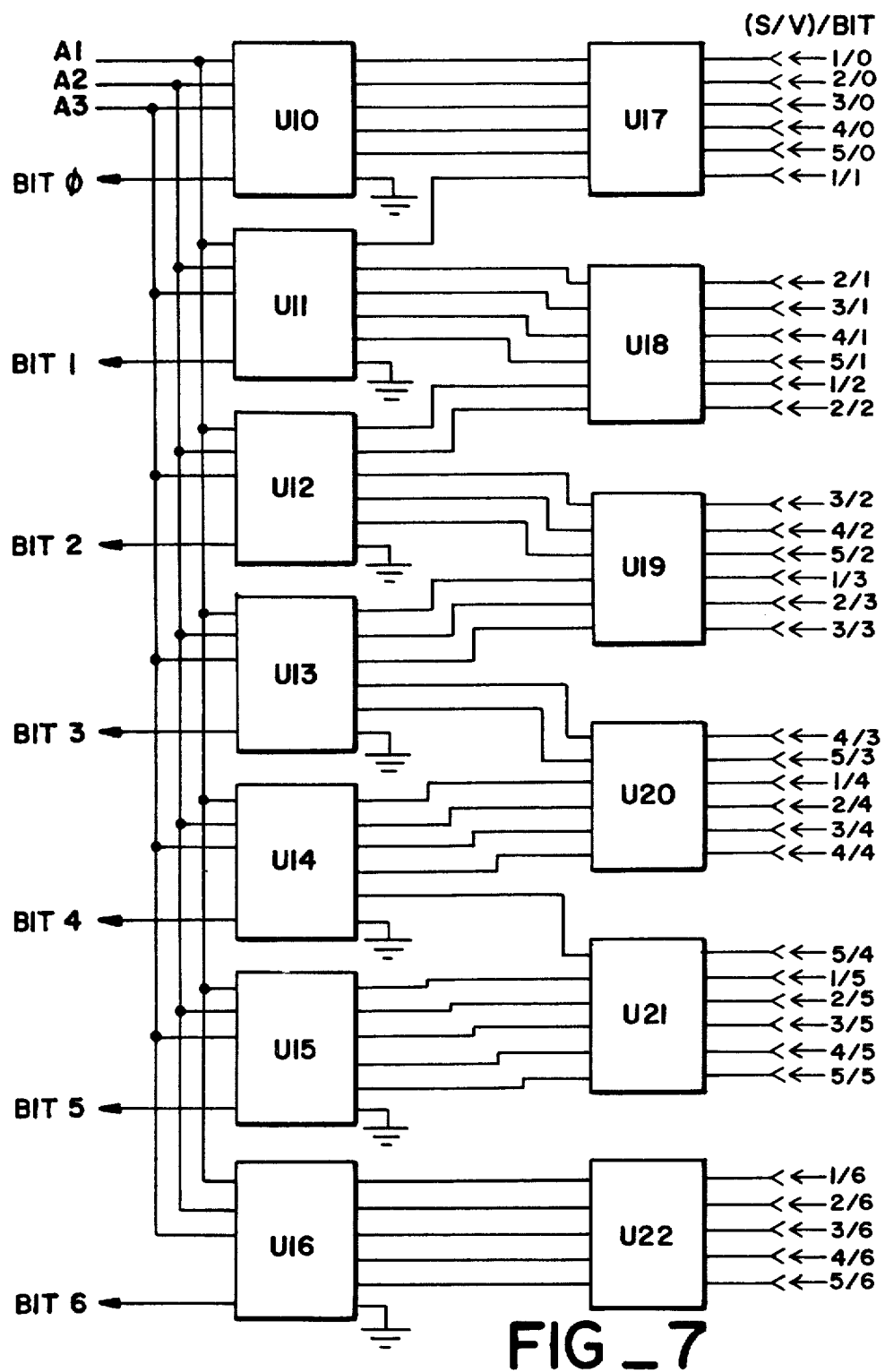
FIG_7

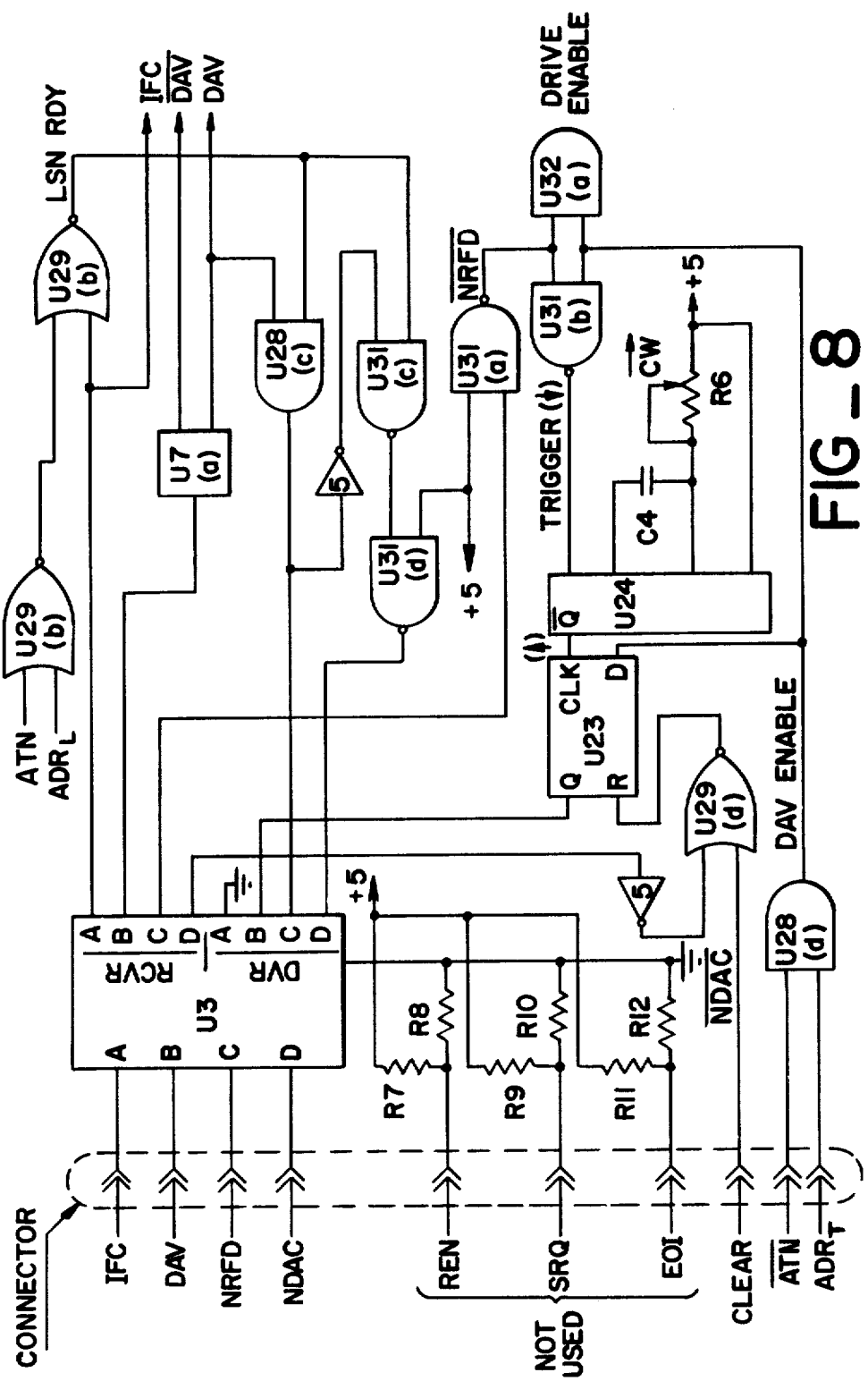
FIG_8

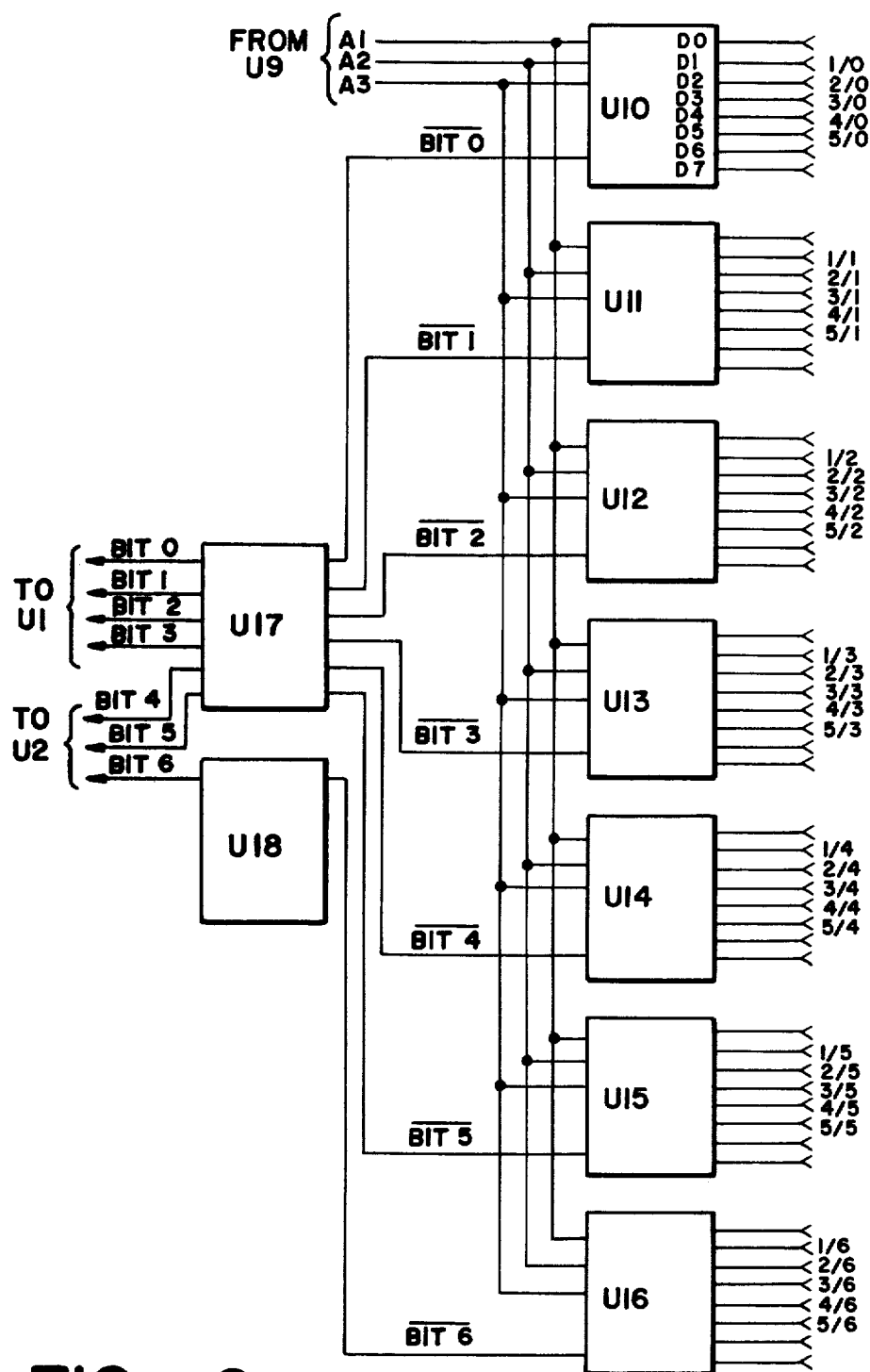
FIG_9

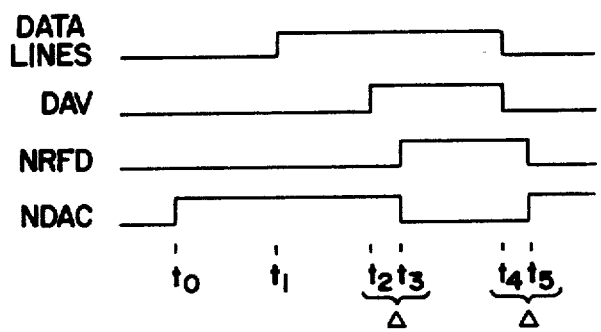

| | |
|---|---|
| $t_0$ | DEVICE DESIGNATED A <u>LISTENER</u> |
| $t_1$ | INFORMATION PLACED ON DATA LINES |
| $t_2$ | <u>TALKER</u> INDICATES DATA IS VALID |
| $t_3$ | DEVICE INDICATES DATA IS ACCEPTED AND THAT IT IS NOT READY FOR MORE DATA |
| $t_4$ | <u>TALKER</u> INDICATES DATA IS INVALID AND REMOVES INFORMATION ON DATA LINES |
| $t_5$ | DEVICE RETURN TO STATE $t_0$ |
| Δ | VARIABLE, 0-100 NANO-SEC |

FIG — 10

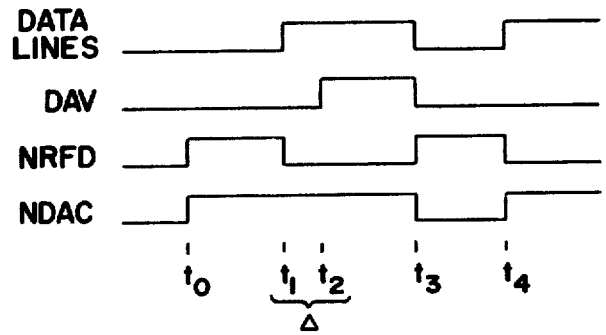

| | |
|---|---|
| $t_0$ | DEVICE DESIGNATED A <u>TALKER</u>; COMPUTER RETURNS BUS TO DATA MODE |
| $t_1$ | COMPUTER READY FOR DATA. VALID DATA ON LINES |
| $t_2$ | DEVICE INDICATES DATA IS VALID |
| $t_3$ | COMPUTER INDICATES RECEIPT OF DATA |
| $t_4$ | RETURN TO STATE $t_1$ |
| Δ | 2 μSEC |

FIG — 11

MULTIPLE SCANIVALVE CONTROL DEVICE

BACKGROUND OF THE INVENTION

1. Field of the Invention

The present invention relates to control circuits, and more particularly to a multiplexer printed circuit board for performing address interrogation for multiple devices under computer control.

2. Description of Prior Art

In tests of compressors and turbines, simultaneous measurements of many steady-state pressures are required. In past years Scanivalves, a registered trademark for a mechanical pneumatic selector switch manufactured by Scanivalve Corporation, have been used for this purpose. A plurality of Scanivalves are incorporated into a data logging system which outputs data on paper tape.

The Scanivalve (S/V) is a device having multiple pneumatic input ports and a single pressure-measuring transducer. A mechanical rotor driven by an electric motor pneumatically connects one input port at a time to the transducer, with the rotor position being controlled electronically. The transducer output is a voltage which after proper conditioning can be measured using a precision voltmeter, and through calibration interpreted as pressure. Operation of the S/V involves address interrogation, position control and transducer measurement. Address interrogation is the identification of the S/V port address; position control is the positioning of the S/V to the specified input port; and transducer measurement is the transforming and sampling of the electrical output of the pressure transducer.

To provide on-line data acquisition to a computer, replacing the data logging system, a S/V control device compatible with the computer system is required to permit acquisition of steady-state data from multiple S/Vs under manual or computer control. The device should be compatible with the IEEE Standard 488-1975, "Digital Interface for Programmable Instrumentation".

SUMMARY OF THE INVENTION

Accordingly, the present invention provides a controller which features digital port address display, manual control functions, signal conditioning, transducer outputs and computer address interrogation of each of a plurality of devices. Particularly for address interrogation a multiplexer printed circuit board is described which is compatible with a standard digital interface bus. The current address is input to the input of a plurality of multiplexers. The address of the device to be selected is sent from the computer to a data input/output circuit. The address is stored and routed to the address input lines of the multiplexers. The state of the selected input lines are transmitted to the computer. Computer software then decodes the device address.

Therefore, it is an object of the present invention to provide a controller for multiple devices to obtain on-line data acquisition.

Another object of the present invention is to provide a multiplexer printed circuit board for computer address interrogation of a plurality of devices.

Still another object of the present invention is to provide a controller compatible with a standard digital interface bus.

Other objects, advantages and novel features of the present invention will be apparent from the following detailed description when read in conjunction with the appended claims and attached drawings.

BRIEF DESCRIPTION OF THE DRAWINGS

FIG. 1 is a schematic of the installation of multiple devices to computer equipment.

FIG. 2 is a functional block diagram of a controller according to the present invention.

FIG. 3 is a function block diagram of the multiplexer printed circuit board (MUX PCB) for the controller of FIG. 2.

FIG. 4 is a schematic of the data input/output section for the MUX PCB of FIG. 3.

FIG. 5 is a schematic of the device address section for the MUX PCB of FIG. 3.

FIG. 6 is a schematic of the data storage section for the MUX PCB of FIG. 3.

FIG. 7 is a schematic of the multiplexer section for the MUX PCB of FIG. 3.

FIG. 8 is a schematic of the handshake section for the MUX PCB of FIG. 3.

FIG. 9 is a schematic of an alternate multiplexer section for the MUX PCB of FIG. 3.

FIG. 10 is a timing diagram for the MUX PCB as a LISTENER.

FIG. 11 is a timing diagram for the MUX PCB as a TALKER.

DESCRIPTION OF THE PREFERRED EMBODIMENT

Referring now to FIG. 1 one or more computers are shown connected to a standard digital interface bus. A plurality of devices, such as the Scanivalves indicated, are to be controlled by the computer(s). The computer in control of the bus interrogates the address of a selected Scanivalve via the MUX PCB. Then the selected position is obtained by closing predetermined relays in the scanner, which in turn connects the control power supply to the selected advance or home control line to switch to the selected address. The data measurement from the selected device, or Scanivalve port, is made by a precision digital voltmeter (DVM) when the commanded transducer is selected, and is input to the computer for display, storage and/or further processing.

FIG. 2 illustrates that the controller provides both automatic and manual capabilities which are independent of each other. The parallel address lines are input to an address decoder/display PCB and to the MUX PCB. The address decoder/display PCB continuously displays the device address while the address is simultaneously available to the computer by the MUX PCB without interference. Manual control line switches and scanner control relays are connected in parallel so that a position control function occurs whenever either the manual or scanner electrical paths are completed. The transducer output lines are connected in parallel from the signal conditioner to both front panel test points and to the scanner relays.

FIGS. 3 through 9 describe the MUX PCB of the controller. To perform the address interrogation task under computer control the MUX PCB is designed to be a peripheral device on the standard digital interface bus so that only one established protocol need be followed regardless of the controlling computer. The address data from the devices being controlled are input to multiplexers. The address of the device to be selected is sent from the computer via the data input/output section to the data store section where it is routed to the address inputs of the multiplexers. The state of the selected multiplexer input lines are transferred to the computer via the data input/output section to complete the address interrogation.

The interface bus is a serial-byte interface which permits bi-directional communication between multiple instruments. All instruments on the bus can be uniquely addressed and can function as either CONTROLLER—controls bus information flow; LISTENER—receives information from the bus; or TALKER—sends information to the bus. The bus uses sixteen lines which have been organized into three functional types: DATA (8), TRANSFER (3) and CONTROL (5) of which the MUX PCB uses only two.

The IFC control line is driven by the bus CONTROLLER to initialize the bus and clear any bus activity. The ATN control line is also driven by the bus CONTROLLER and places the bus in either the COMMAND mode or the DATA mode. In the COMMAND mode address information is transmitted on the data lines to establish those instruments that are to talk, listen or remain dormant. In the DATA mode the instrument addressed to talk communicates on the data lines with those instruments addressed to listen. Only one TALKER is permitted.

The three transfer lines (DAV, NRFD, NDAC) execute the transfer of each information byte on the data lines by an interlocked "handshake" technique. This allows a synchronous data transfer at the speed of the slowest instrument on the bus. The DAV (data valid) line is driven by the TALKER and indicates the validity of the information on the data lines. When DAV is driven true, information on the data lines is unconditionally valid. The NRFD (not ready for data) and NDAC (not data accepted) lines are driven by all LISTENERS to indicate if they are ready to accept data or if the data has been accepted. When NFRD is driven false, a LISTENER indicates that it is unconditionally ready to accept one information byte. When NDAC is driven false, a LISTENER indicates that the information byte has been unconditionally accepted and that the information on the data lines is no longer needed.

The following sequence of events occurs each time the MUX PCB supplies the computer with device address information:

1. Bus placed in COMMAND mode
2. MUX PCB addressed to LISTEN
3. Bus placed in DATA mode
4. Data byte sent to MUX PCB
5. Bus placed in COMMAND mode
6. MUX PCB addressed to TALK
7. Bus placed in DATA mode
8. Computer reads one byte of data The data input/output section (FIG. 4) uses bi-directional data lines since the MUX PCB functions at different times as both a LISTENER and a TALKER. The receiver (RCVR) is a standard inverter while the driver (DVR) is an open-collector NAND gate. Each individual bus line, whether used or not, must be terminated in a resistor divider network, R1 and R2 as shown for input line DIO8. The ATN line and seven data lines DIO1 through DIO7 are connected from the bus to bus transceivers U1 and U2. For this particular embodiment using five Scanivalve devices DIO8 is not used. The received lines ($\overline{B1}$-$\overline{B7}$) are inverted (B1-B7) for use in other parts of the MUX PCB circuit. The driver input lines to U1 and U2 from the multiplexer section identify the selected device address. The DRIVER/ENABLE line from the "handshake" section enables the bus drivers in U1 and U2 to place data on the data lines.

The device address section (FIG. 5) determines when the MUX PCB has been addressed to talk or listen. When the bus is in the COMMAND mode (ATN), the bus CONTROLLER places an address word on the data lines. If the received address word corresponds to the address physically set on the circuit board by the device address switch, the logic state of one address line ($ADR_T$ or $ADR_L$) will be defined "true". The state of this line remains valid after the bus returns to the DATA mode ($\overline{ATN}$) unless cleared by IFC.

A five-bit comparator U6 compares the five-bit address (B1-B5) with the preset device address (A1-A5). When DAV is true and the bit patterns match, the ADDRESS ENABLE line goes high to enable gates U27(a) and U27(b). Gates U27(a), U30(c), U26, U30(d) and U7(c) implement the $ADR_T$ expression. Similarly gates U27(b), U30(b), U25, U30(a) and U7(b) implement the $ADR_L$ expression.

The data storage section (FIG. 6) has a positive-edge-triggered flip-flop U9. Data appearing on the input is transferred to the output only when the clock line transitions from a low to a high state. Thus data storage is controlled by the DATA STORE line connected to the clock input gate. When addressed to listen ($ADR_L$) while the bus is in the DATA mode, the three least significant bits on the data lines (B1-B3) are stored whenever the TALKER sets DAV "true". The three bits A1-A3 are used to select device address data.

The multiplexer circuit (FIG. 7) has the address lines A1-A3 connected to the data select pins of multiplexers U1-U16. The bit pattern on these lines determines which of up to eight multiplexer input lines is selected. For this embodiment only inputs one through five are connected, corresponding to Scanivalves one through five. A Scanivalve port address is represented by seven bits with the output of each multiplexer representing one of these bits. Multiplexer inputs are the corresponding bits from each of five Scanivalves. Buffers U17-U22 invert the Scanivalve address data bits to make multiplexer input logic conform to the "high"="true" convention.

The "handshake" section (FIG. 8) executes the transfer of each information byte by manipulating the transfer lines. Circuit response is dependent upon the designated function of the MUX PCB, i.e., LISTENER, TALKER or dormant. The driver circuits in bus transceiver U3 are permanently enabled, therefore, line driver-enabling logic is incorporated into the individual driver inputs.

The "handshake" section responds as a LISTENER whenever designated as such ($ADR_L$) or when the bus is in the COMMAND mode (ATN). As a LISTENER the DAV line is received and the NRFD and NDAC lines are driven. FIG. 10 shows the timing sequence of these transfer lines during the transfer of one byte from the computer. The received DAV line is sampled periodically, such as every 100 nsecs, by the clocked flip-flop U7(a). Depending upon the synchronization of DAV with the CLOCK signal, a time delay of approximately zero to the period (100 nsecs) occurs between the time of receipt and the time DAV is available to the remainder of the circuit. A listen ready line (LSN RDY), implemented by U29(b) and U29(a), is combined with DAV to drive the NRFD line by U28(c) and the NDAC line by U5, U31(c) and U31(d).

The "handshake" section responds as a TALKER when so designated by the computer (ADR$_T$). As a TALKER the DAV line is driven and the NRFD and NDAC lines are received. The timing sequence of the transfer lines during the transfer of one data byte to the computer is shown in FIG. 11. Information is placed on the data lines whenever the DRIVE ENABLE line, as determined by U28(d) and U32(a), is "true". When this condition is present, device address information is unconditionally present on the data lines. The driven DAV line is defined by U31(a) and U29(d). When using open-collector bus drivers, a 2 μsec delay is required to allow line ringing and signal transients to decay. The delay is provided by U24, a retriggerable one-shot multivibrator, and U23, a positive-edge-triggered flip-flop. These components provide a pre-set delay between receipt of $\overline{\text{NRFD}}$ and driving the DAV line "true". R6 is used to adjust the time delay.

The CLOCK, shown in FIG. 3, is a multivibrator and crystal oscillator with a sinusoidal output such as 10 MHz. The CLEAR circuit sets the initial operating state of the MUX PCB when power is first applied and also monitors the IFC control line. A clear signal sets ADR$_L$, ADR$_T$ and DRIVER ENABLE "false" and disables all "handshake" driver lines. The stored data lines A1–A3 and ADR$_L$ and ADR$_T$ may be displayed by appropriate LED circuits.

FIG. 9 is an alternate multiplexer section. This design provides greater input flexibility and fewer components while functioning in essentially the same manner.

Therefore, the present invention provides a controller which, when used together with a scanner and DVM, allows data acquisition from a plurality of multiport devices on-line to any computer which is compatible with the IEEE standard digital interface bus.

What is claimed is:

1. A controller which, when used in concert with a scanner and a digital voltmeter, allows selective real-time, on-line data acquisition from a plurality of multiport pressure-monitoring instruments by manual control simultaneous with computer control by any computer compatible with a digital interface bus conforming to IEEE Standard 488-1975, each of said pressure-monitoring instruments having a single transducer output signal dependent upon which of said ports is interrogated comprising:
    (a) a plurality of signal conditioning control sets, each of said sets receiving as input the output of one of said transducer output signals, said signal conditioning control sets providing span and balance voltage adjustment of said transducer output signals and having outputs to front panel test points on said controller and to said scanner;
    (b) a plurality of manual control line switches connected with control lines parallel to control lines of said computer to relays in said scanner to effect a position control function in a selected pressure monitoring instrument whenever the electrical path of either of said control lines is completed;
    (c) a power supply connected to said scanner, said manual control line switches and said signal conditioning control sets such that selective adjustment of said transducer output signals and selective energization of said relays is achieved;
    (d) a printed circuit board receiving as inputs port address data from said transducer output signals and continuously displaying said port address data; and
    (e) a multiplexing printed circuit board receiving as inputs port address data from said transducer output signals and interfacing with said digital interface bus such that said computer control of said data address interrogation may function independently and simultaneously with said manual control.

* * * * *